(12) United States Patent
Costa

(10) Patent No.: US 6,626,616 B2
(45) Date of Patent: Sep. 30, 2003

(54) TAPPING TOOL FOR PVC PIPES AND FITTINGS

(76) Inventor: John Costa, 1574 SW. 2nd St., Boca Raton, FL (US) 33486

( * ) Notice: Subject to any disclaimer, the term of this patent is extended or adjusted under 35 U.S.C. 154(b) by 72 days.

(21) Appl. No.: 09/941,025

(22) Filed: Aug. 28, 2001

(65) Prior Publication Data

US 2003/0044249 A1 Mar. 6, 2003

(51) Int. Cl.[7] .................................................. B23G 5/06
(52) U.S. Cl. ........................ 408/124; 408/199; 408/222; 470/198
(58) Field of Search ................................. 408/124, 199, 408/215, 222; 470/198, 204

(56) References Cited

U.S. PATENT DOCUMENTS

| | | | | |
|---|---|---|---|---|
| 614,226 A | * | 11/1898 | Huxley .................... 408/83.5 |
| 1,301,802 A | * | 4/1919 | Anderson .................... 279/93 |
| 2,053,253 A | * | 9/1936 | Dennis et al. ............... 408/118 |
| 2,110,618 A | * | 3/1938 | Baird .......................... 76/117 |
| 2,465,541 A | * | 3/1949 | Kreshock .................... 408/215 |
| 2,661,123 A | * | 12/1953 | Guarino ........................ 222/91 |
| 5,281,059 A | * | 1/1994 | Stuckle ........................ 408/156 |
| 6,349,624 B1 | * | 2/2002 | Fahringer .................... 81/441 |

FOREIGN PATENT DOCUMENTS

WO 00103 * 1/1988 ................. 470/198

* cited by examiner

*Primary Examiner*—Daniel W. Howell
(74) *Attorney, Agent, or Firm*—Robert M. Downey, PA

(57) ABSTRACT

A tapping tool for repairing damaged threads on PVC pipe and PVC pipe fittings (e.g. T-connectors, elbows, etc.) includes an elongate shaft with a handle member fixed to a proximal end and a head fixed to an opposite distal end. A threaded tap formed of hardened steel is positioned and disposed on the head for forced, threaded engagement with the threads of the PVC pipe or fitting. Manual rotation of the handle serves to advance and withdraw the head along the threads of the PVC pipe or fitting as the tap cuts and reshapes damaged threads, thereby restoring the threads of the PVC pipe or fitting to a uniform, functional condition.

3 Claims, 2 Drawing Sheets

TAPPING TOOL FOR PVC PIPES AND FITTINGS

BACKGROUND OF THE INVENTION

1. Field of the Invention

The present invention is directed to manually operated repair tool and, more particularly, to a tapping tool for repairing threads on PVC pipes and PVC pipe fittings.

2. Discussion of the Related Art

Fluid transfer systems such as those used for underground sprinklers, pools, and residential and commercial plumbing typically use PVC (poly vinyl chloride) pipes and fittings having internal and/or external threads for interconnecting the pipes and fittings according to a desired arrangement. During the continued use and repair of these systems it is not uncommon for the threads of the interconnecting PVC components to become damaged. When this happens, it is usually necessary to remove the damaged component and replace it with a new PVC pipe section and/or PVC fitting. In many cases, this involves a time consuming and costly repair procedure. Often, the cost of the labor to make the repair far exceeds the cost of the replacement parts.

For example, automatic sprinkler systems typically use PVC supply lines which branch out from a main supply and directional valve control to several zones. The supply lines extend underground, usually at a depth of between 12–18 inches below the ground surface. At select locations throughout each zone, sprinkler heads are interconnected to the supply line with the use of T-connectors, elbows or other fittings. A PVC riser pipe or other vertically extending PVC conduit structure is often used for delivering water from the supply line to the sprinkler head. The lower end of the riser pipe or other connecting component is provided with threads for attachment with threads on the underground PVC fitting. In some instances, the sprinkler head is positioned just below the ground surface, in a pop-up assembly, whereupon water pressure delivered to the sprinkler head causes telescopic extension of the pop-up assembly to elevate the sprinkler head when the zone is active. In other installations, the sprinkler head is secured on a fixed riser which threadably connects to the fitting on the underground supply line to position the sprinkler head at select distances relative to the ground surface and/or surrounding shrubs. Over time, the sprinkler heads and attached risers and/or other vertical extending structures are accidentally bumped, kicked and/or stepped on by playing children, yard maintenance people and others traveling across the lawn or through the shrubs. Moreover, sprinkler heads and attached risers are often damaged or broken by equipment such as lawn mowers, tractors, weed cutters and even automobiles which are accidentally driven into or over a sprinkler head. In other instances, the sprinkler head housing or riser is slowly rotated, over a length of time, due to the initial force of the water hammer against the sprinkler head when the zone is first activated, causing the threaded connection between the riser or sprinkler head and underground PVC fitting to become loosened. When the threaded connection between the riser and fitting is loosened, whether it be by the forces of water pressure or accidental contact by people or equipment, debris such as dirt and small pebbles enters between the threads on the end of the riser or sprinkler head housing and the fitting on the supply line. When the threaded connection is subsequently tightened, the threads on the PVC fittings become damaged by the dirt and other debris. Eventually, the damage to the threads becomes so severe that a threaded connection between the riser and fitting is no longer possible. This problem is usually noticed when the zone is activated and water gushes up from the ground where the damaged fitting is located.

Damage to the threads of the PVC fitting on the underground supply line may also result when a riser or other vertical extending structure is broken at or near the threaded connection. In attempting to remove the broken piece which remains threadably connected to the fitting, damage to the threads of the fitting often results, thereby preventing proper threaded attachment of a new riser pipe, sprinkler head housing or other component thereto.

Presently, there is no tool or other instrument available to repair the damaged threads of a PVC pipe or PVC fitting. Moreover, there is presently no tool or instrument available to repair the damaged threads of an underground PVC fitting (e.g. T-connector, elbow, etc.) such as that found in an underground sprinkler system. Thus, as explained above, when the threads of a PVC pipe section, fitting or other component become damaged, it is necessary to remove and replace the entire PVC component. In the example of an underground sprinkler system, when the threads of a T-connector, elbow or other underground PVC fitting become damaged, it is necessary to dig a large trench in order to gain access to the supply line and fitting. Next, it is necessary to cut the supply line at two locations, on opposite sides of the damaged fitting, in order to remove the damaged fitting from the underground system. A new fitting must then be attached to the supply line, usually with the use of glue and short pipe segments. A new riser or other sprinkler head device can then be threadably connected to the fitting prior to filling in the trench. This repair process proves to be time consuming and costly, particularly for the average homeowner who must pay a sprinkler repair service an hourly fee to complete the job.

Accordingly, in view of the foregoing problems associated with the damage to threaded connections of PVC pipes and PVC fittings, there remains an urgent need for a tool which is adapted to quickly and effectively repair the damaged threads without the need of costly and time consuming repairs.

SUMMARY OF THE INVENTION

The present invention is directed to a tapping tool for repairing damaged threads on PVC pipe and PVC pipe fittings (e.g. T-connectors, elbows, joints, etc.). The tapping tool includes an elongate rigid shaft having a proximal end and a distal end. A head fixed to the distal end is provided with a threaded tap formed of hardened steel for threaded engagement with the threads of the PVC pipe or PVC pipe fitting. Manual rotation of the shaft and head, using a handle fixed to the proximal end of the shaft, serves to advance and withdraw the threaded tap along the threads of the PVC pipe or fitting as the tap threads cut and reshape the damaged PVC threads, thereby restoring the threads of the PVC pipe or PVC pipe fitting to a uniform, functional condition.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENTS

Referring to the several views of the drawings, the PVC tapping tool of the present invention is shown and is generally indicated as 10.

Figure 1:
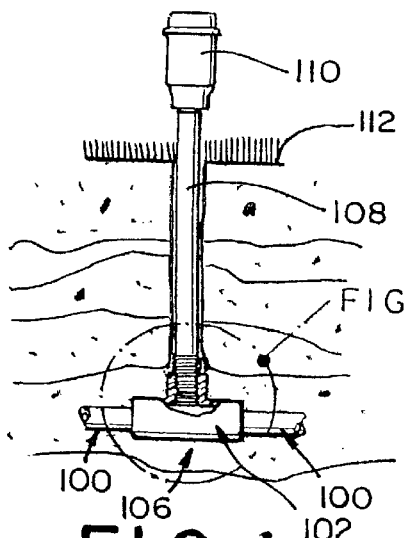
FIG. 1 is an elevational view, in partial cross-section, illustrating a sprinkler head and riser connected to an underground water supply pipe in a typical automatic sprinkler system.
Figure 2:
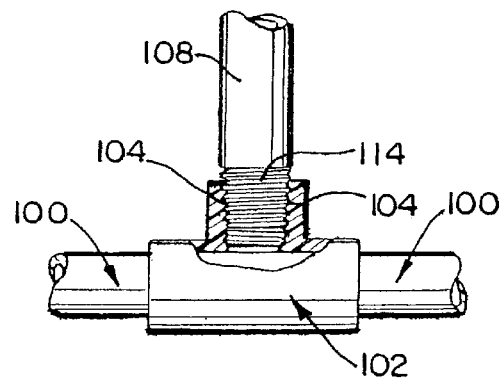
FIG. 2 is an isolated cut-away view, in partial cross-section, taken from the area indicated as FIG. 2 in FIG. 1.

With initial reference to FIG. 1, the tool of the present invention is intended to repair damaged threads which sometimes occur between two threaded fittings of a PVC pipe or conduit system. While it is contemplated that the tool 10 of the present invention is to be used to repair threads on PVC pipes and fittings in various systems, including but not limited to, underground sprinkler systems, fire sprinkler systems in buildings, electrical wiring conduit and swimming pool circulation systems, the drawings show an example relating to the repair of threads in an underground sprinkler system 106. Specifically, referring to FIG. 1, underground sprinkler systems commonly include an underground water supply conduit 100 formed of PVC which interconnects with various fittings at spaced locations throughout a property. The example in FIG. 1 shows the underground water supply conduit 100 connected to a PVC pipe fitting, and particularly a T-connector 102. As seen in FIG. 2, the T-connector 102 or other like fitting in an underground sprinkler system 106 is provided with interior threads 104 which are specifically intended for threaded engagement of exterior threads 114 of a sprinkler attachment component. In the example shown in FIGS. 1 and 2, the sprinkler attachment component is a riser pipe 108 which threadably attaches to the T-connector 102 at one end and extends upwardly above the ground surface 112 to a top end which is fitted with a sprinkler head 110.

As often occurs in sprinkler systems, the interior threads 104 which serve to connect the attachment fitting, such as the riser pipe 108, may become damaged. When this happens, a leak develops and, often, the riser pipe 108 or other attachment is separated from the fitting 102 by the force of the water traveling through the supply pipe 100 and to the riser pipe 108.

Figure 3:
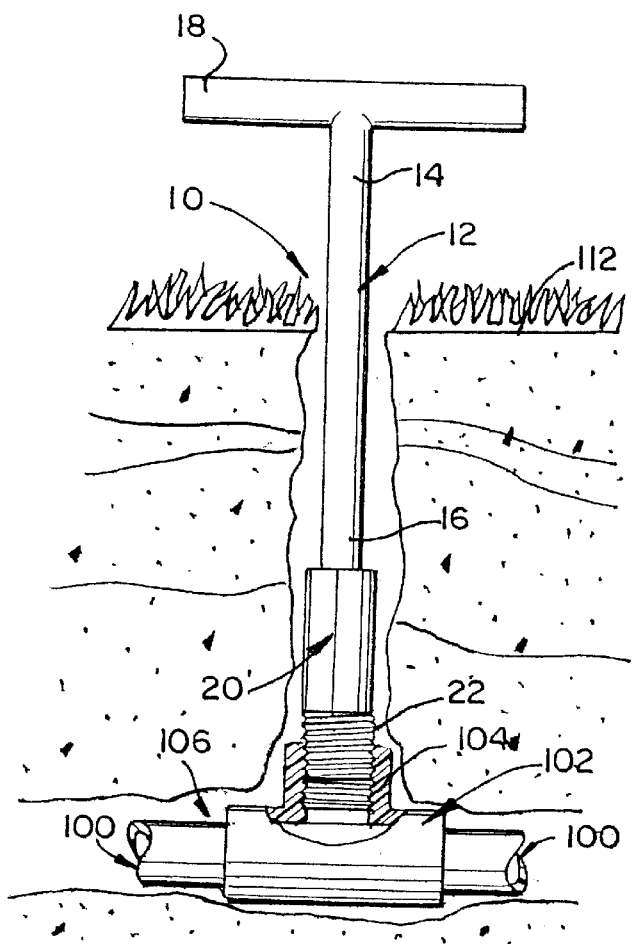
FIG. 3 is an elevational view, in partial cross-section, showing the tapping tool of the present invention engaged with an underground PVC T-connector of the underground sprinkler system of FIGS. 1 and 2, wherein the tapping tool is being used to repair damaged interior threads of the PVC T-connector.
Figure 5:
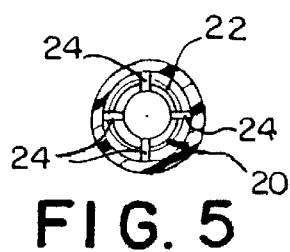
FIG. 5 is a cross-sectional view, taken along the plane of the line 5—5 of FIG. 4.
Figure 4:
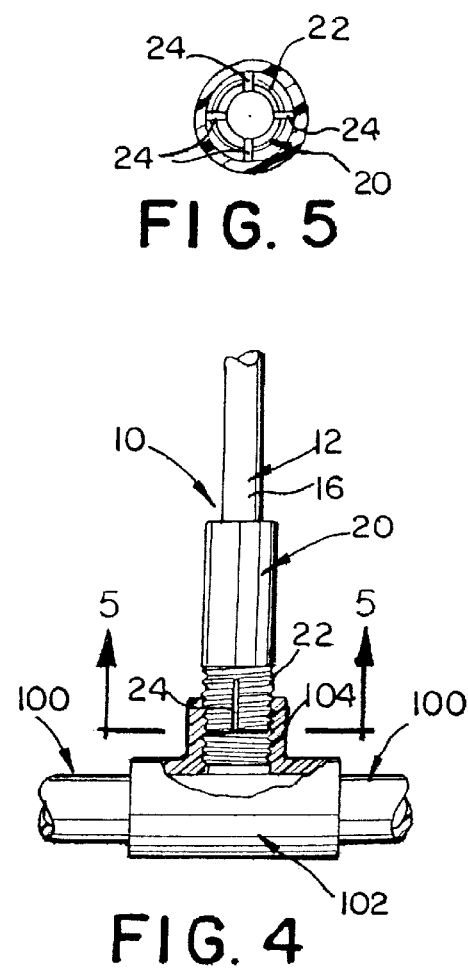
FIG. 4 is an isolated view, in partial cross-section and cut-away, showing the head of the tapping tool operatively engaged with the PVC T-connector of the sprinkler system for repairing the damaged interior threads.
Figure 6:
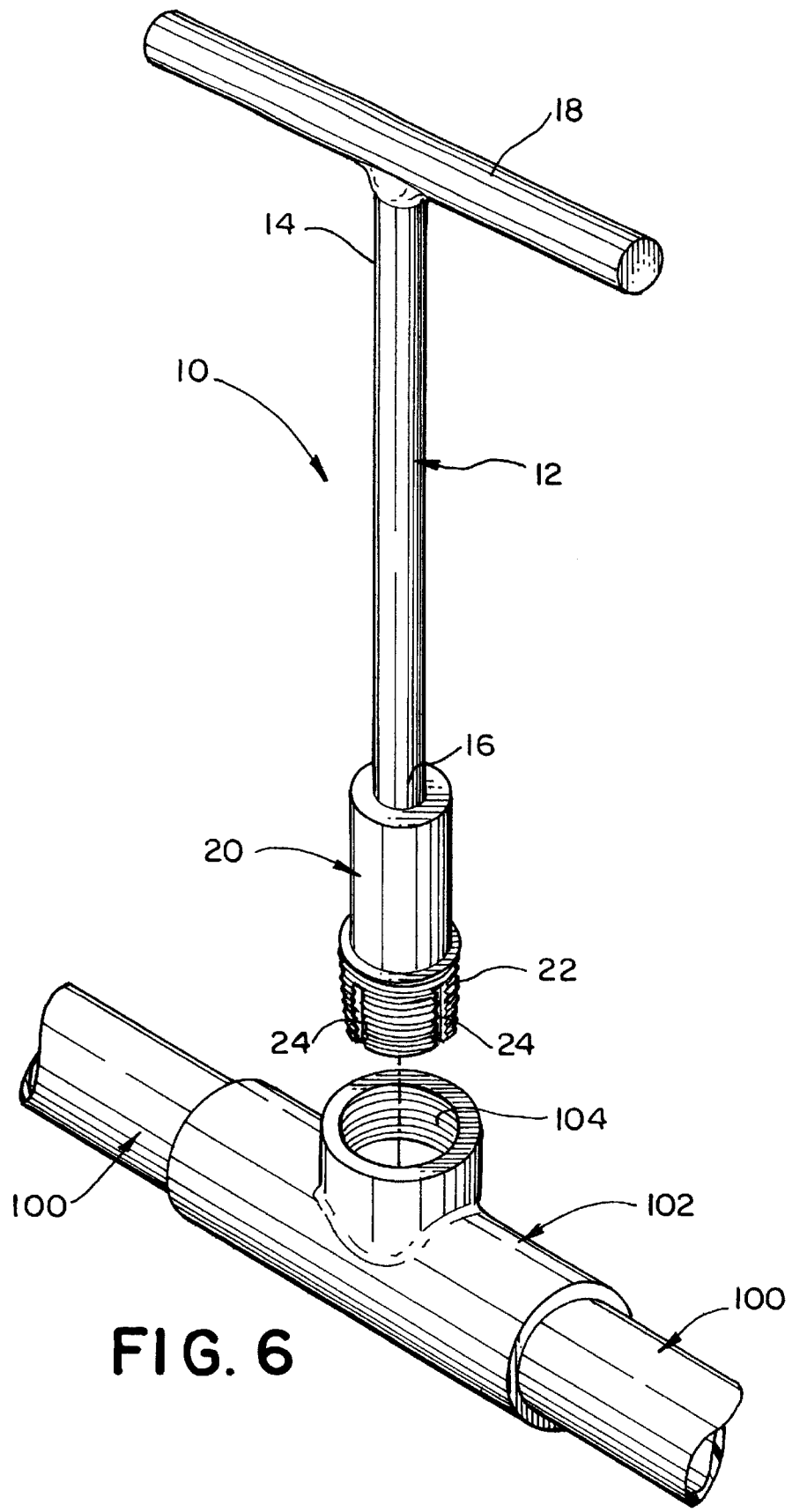
FIG. 6 is a partially exploded perspective view showing the tapping tool of the present invention separated from the PVC T-connector fitting of the sprinkler system.

As seen in FIGS. 3, 4 and 6, the tapping tool 10 of the present invention includes an elongate shaft 12 having a proximal end zone 14 and a distal end zone 16. A handle 18 is fitted to the proximal end zone. In a preferred embodiment, the handle 18 is formed of a same or similar shaped material as the shaft 12, such as a steel rod, and is welded or otherwise attached to the proximal end so that the handle extends generally perpendicular to the shaft 12. Thus, the combined handle and shaft form a generally T-shaped configuration. It should be noted, however, that the handle 18 may be formed, configured and attached to the shaft in an manner which serves to perform the desired function of manually rotating the shaft 12 and a head 20 on the distal end zone 16 of the shaft 12, upon manual manipulation of the handle 18.

The head 20 of the tapping tool 10 includes a threaded distal end portion 22 defining a tap. The tap is provided with a plurality of longitudinal slots 24 which extend from a bottom free edge of the tap and upwardly towards the shaft, terminating within the tap portion of the head. The longitudinal slots 24 are specifically structured and disposed to permit slight compression of the outer circumference of the threaded tap when subjected to a radially directed inward force as the threaded tap 22 is advanced within the fitting 102 to repair the interior threads 104.

In use, the tapping tool 10 of the present invention is used in the following manner to repair the threads of a PVC fitting of an underground sprinkler system. First, when a damaged threaded connection between a connecting component such as a riser pipe 108 and the fitting 102 is detected, the connecting component 108 is removed. In the example shown in the drawings, the riser pipe 108 is completely separated from the fitting 102 and removed from the underground sprinkler system 106. The sprinkler system is then activated to direct water flow to the appropriate zone of the sprinkler system and through the water supply pipe 100, causing water to gush upwardly from the now open end of the fitting 102 and through the channel leading to the ground surface 112. This serves to clear the channel and the open end of the fitting 102 from dirt and other debris, so that the damaged interior threaded surface 104 is clean. The head 20 of the tool 10 is then inserted downwardly through the channel, below the ground surface 112 until the threaded tap 22 aligns with and threadably engages with interior damaged threads 104 at the open end of the fitting 102. Then, by manually rotating the handle 18 to turn the shaft 12 and head 20 in a clockwise direction, the threads of the tap are caused to advance downwardly along the length of the damaged threads 104, as seen in FIGS. 3 and 4. This serves to cut away PVC material resulting from crushed or damaged threads, thereby reshaping the damaged threads and restoring them to a functional, like new condition. To insure that the threads are cleanly cut and repaired, it is recommended that the tap be operated through several cycles of advancement and withdrawing along the damaged threads. The tap is withdrawn from the interior threads 104 of the fitting 102 by reverse rotation of the handle 18 to rotate the shaft 12 and the head 20 in a counterclockwise direction, until the threads of the tap 22 separate from the open end of the fitting 102. The tool 10 is then removed from the ground and a riser 108 or other attachment component having clean, non-damaged threads is inserted below the ground surface for threaded engagement with the interior threads 104 of the open end of the fitting 102.

While the present invention has been shown and described in accordance with a preferred and practical embodiment thereof, it is recognized that departures from the instant disclosure are contemplated within the spirit and scope of the invention which is not to be limited except as defined in the following claims as interpreted under the doctrine of equivalents.

What is claimed is:

1. A tool for repairing damaged threads on PVC pipe and PVC pipe fittings comprising:

an elongate shaft having a proximal end zone and an opposite distal end zone;

a handle fixed on said proximal end zone;

a head fixed on said distal end zone;

said elongate shaft, said handle and said head being fixed in rigid non-moving position relative to one another as in integral, one-piece unit;

said head including a thread tap defined by a cylindrical wall terminating at an annular rim and surrounding a hollow interior, and said cylindrical wall having an outer circumferential surface formed with threads for forced threaded engagement with the damaged threads of the PVC pipe and PVC pipe fittings and said thread tap on said head being structured and disposed to cut and reshape the damaged threads upon advancement and withdrawal of said head relative to the damaged threads by manually rotating the handle and thereby restoring the damaged threads to an operable condition; and said head further including a plurality of axial slots cut through said cylindrical wall, in communication with said hollow interior, and extending from said annular rim and towards said handle along at least a portion of a length of said head measured between said annular rim and said distal end zone of said shaft, said plurality of axial slots allowing yielding inward movement of said cylindrical wall towards said hollow interior in response to inwardly directed radial forces upon advancement of said thread tap of said head along the damaged threads of the PVC pipe and PVC pipe fittings.

2. The tool as recited in claim 1 wherein said handle is perpendicular relative to said shaft.

3. The tool as recited in claim 1 wherein said thread tap is formed of hardened steel.

* * * * *